(12) United States Patent
Lee et al.

(10) Patent No.: US 10,464,145 B2
(45) Date of Patent: Nov. 5, 2019

(54) CUTTING INSERT AND CUTTING TOOL EQUIPPED THEREWITH

(71) Applicant: KORLOY INC., Seoul (KR)

(72) Inventors: Nam-seon Lee, Cheongju-si (KR);
Ki-chan Nam, Cheongju-si (KR);
Kane-hee Lee, Cheongju-si (KR);
Hyo-san Kim, Cheongju-si (KR);
Young-heum Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 17 days.

(21) Appl. No.: 15/755,406

(22) PCT Filed: May 27, 2016

(86) PCT No.: PCT/KR2016/005642
§ 371 (c)(1),
(2) Date: Feb. 26, 2018

(87) PCT Pub. No.: WO2017/039122
PCT Pub. Date: Mar. 9, 2017

(65) Prior Publication Data
US 2018/0200808 A1 Jul. 19, 2018

(30) Foreign Application Priority Data

Aug. 28, 2015 (KR) .......................... 10-2015-0121677

(51) Int. Cl.
*B23C 5/20* (2006.01)

(52) U.S. Cl.
CPC .............. *B23C 5/205* (2013.01); *B23C 5/207* (2013.01); *B23C 2200/0411* (2013.01);
(Continued)

(58) Field of Classification Search
CPC ... B23C 5/207; B23C 5/20; B23C 2200/0472; B23C 2200/208; B23C 2200/16; B23C 2200/0477
See application file for complete search history.

(56) References Cited

U.S. PATENT DOCUMENTS 3,541,655 A * 11/1970 Stier ....................... B23C 5/207
407/113
4,880,338 A * 11/1989 Stashko ................ B23B 27/143
407/114
(Continued)

FOREIGN PATENT DOCUMENTS

WO WO-2014/046260 A1 3/2014

*Primary Examiner* — Nicole N Ramos
(74) *Attorney, Agent, or Firm* — Rabin & Berdo, P.C.

(57) ABSTRACT

The technical objective of the present invention is to provide a cutting insert that has an improved fastening property with a cutting tool, thereby preventing reduction of the service life. To this end, the cutting insert according to the present invention has three corners along the circumference thereof; an upper main cutting edge, which is formed on the edge between the upper surface and the first side surface, and an upper sub cutting edge, which is formed on the edge between the upper surface and the second side surface, are continuously disposed between respective corners; the lower surface has the same shape as that of the upper surface; and the angle defined between the upper main cutting edge and the upper sub cutting edge, which are placed on both sides with reference to each corner, is larger than or equal to 85° and is smaller than 90°.

14 Claims, 9 Drawing Sheets

(52) U.S. Cl.
CPC .. *B23C 2200/0483* (2013.01); *B23C 2200/20* (2013.01); *B23C 2200/286* (2013.01); *B23C 2200/323* (2013.01); *B23C 2200/361* (2013.01)

(56) References Cited

U.S. PATENT DOCUMENTS

| | | | | |
|---|---|---|---|---|
| 5,951,214 | A | * | 9/1999 | Rothballer ............ B23C 5/2213 407/113 |
| 8,177,460 | B2 | * | 5/2012 | Satran ................... B23C 5/2213 407/113 |
| 9,022,700 | B2 | * | 5/2015 | Bhagath ................ B23B 27/007 407/113 |
| RE45,845 | E | * | 1/2016 | Men ........................ B23C 5/202 |
| 9,975,188 | B2 | * | 5/2018 | Roman ................... B23C 5/207 |
| 2007/0003384 | A1 | * | 1/2007 | Smilovici ............. B23C 5/2221 407/113 |
| 2013/0294850 | A1 | * | 11/2013 | Park ......................... B23C 5/06 407/47 |
| 2014/0076117 | A1 | * | 3/2014 | Shibata .................... B23C 5/06 83/13 |
| 2015/0190868 | A1 | * | 7/2015 | Koifman ................. B23C 5/207 407/11 |

\* cited by examiner

CUTTING INSERT AND CUTTING TOOL EQUIPPED THEREWITH

TECHNICAL FIELD

The present disclosure relates to a cutting insert used for cutting or grooving and so on, and a cutting tool equipped therewith.

BACKGROUND ART

Generally, an insert is fastened to a cutting tool mounted on a machine tool and is used for cutting a workpiece made of iron, non-ferrous metal, non-metal material, and so on.

Such an insert typically has an upper surface, a lower surface, and a plurality of side surfaces connecting the upper surface and the lower surface. An upper cutting edge is provided between the side surface and the upper surface, and a lower cutting edge is provided between the side surface and the lower surface.

FIG. 8 is a plan view of a conventional milling insert, FIG. 9 is a side view of the milling insert of FIG. 8, and FIG. 10 is a view of a milling tool equipped with the milling insert of FIG. 8.

As shown in FIGS. 8 and 9, an example of the conventional milling insert 10 can be found in Korean Patent No. 10-1240880, which includes an upper side (upper surface) 11, a lower side (lower surface) 12 and a plurality of blade surfaces (side surfaces) 13A, 13B, 14A, 14B, 15A and 15B formed therebetween, in which the upper side 11 and the lower side 12 are substantially the same such that both sides can be used, and in which a main cutting blade (main cutting edge) 16 and a sub cutting blade (sub cutting edge) 17 are formed such that the intersecting lines between the blade surface and the upper and lower sides are substantially perpendicular to each other.

In addition, the conventional milling insert 10 is mounted in the pocket of the milling tool 40, as shown in FIG. 10. Specifically, some of a plurality of blade surfaces are mounted on the seat surface of the pocket of the milling tool 40, and the other blade surfaces are positioned on the outer circumferential surface and the bottom surface of the milling tool 40. Accordingly, the main cutting blade 16 formed on the other blade surface side is placed on the outer circumferential surface of the milling tool 40, and the sub cutting blade 17 is placed on the bottom surface of the milling tool 40, thus cutting a perpendicular groove on the workpiece 50 with rotation of the milling tool 40.

However, in the conventional milling insert 10, since the main cutting blade 16 and the minor cutting blade 17, which are formed on some of the blade surfaces, are perpendicular, some of the blade surfaces mounted on the seat surface of the milling tool 40 also have a structure in which they are perpendicular to each other, and accordingly, it is difficult to effectively control the centrifugal force exerted on the milling insert 10 during rotation of the milling tool 40 due to the poor fastening property with the milling tool 40. That is, such deteriorating fastening property of the milling insert 10 with respect to the milling tool 40 causes a problem during rotation of the milling tool 40 that the milling insert 10 or the milling tool 40 shakes or wears, thus shortening the lifespan of the milling insert 10 or the milling tool 40.

DISCLOSURE

Technical Problem

The present disclosure is designed to solve the problems of the related art, and therefore the present disclosure is directed to providing a cutting insert having an improved fastening property with a cutting tool, thereby preventing reduction of the service life.

The present disclosure is also directed to providing a cutting tool that can prevent the deterioration of service life by increasing the fastening property with the cutting insert.

Technical Solution

In one aspect of the present disclosure, there is provided a cutting insert according to an embodiment, in which the cutting insert has three corners along the circumference thereof; an upper main cutting edge, which is formed on the edge between the upper surface and the first side surface, and an upper sub cutting edge, which is formed on the edge between the upper surface and the second side surface, are continuously disposed between respective corners; the lower surface has the same shape as that of the upper surface; and the angle defined between the upper main cutting edge and the upper sub cutting edge, which are placed on both sides with reference to each corner, is larger than or equal to 85° and is smaller than 90°.

For example, the upper surface may include a planar portion, and the first side surface may include first, second and third clearance surfaces in a first direction from the upper surface toward the lower surface, the first clearance surface may form a first obtuse angle in the first direction with respect to a reference surface parallel to the planar portion and reach the second clearance surface, the second clearance surface may form a right angle with the reference surface and reach the third clearance surface and a portion of the lower surface, and the third clearance surface forms a first acute angle with respect to the reference surface in the first direction and reaches another portion of the lower surface.

The second side surface may include fourth, fifth and sixth clearance surfaces in a second direction from the lower surface toward the upper surface, the fourth clearance surface may form a second obtuse angle with respect to the reference surface in the second direction and reaches the fifth clearance surface, the fifth clearance surface may form a right angle with respect to the reference surface and reaches the sixth clearance surface and a portion of the upper surface, and the sixth clearance surface may form a second acute angle with respect to the reference surface in the second direction and reaches another portion of the upper surface.

The third clearance surface may have a shape in which the third clearance surface becomes gradually wider toward the lower surface, the sixth clearance surface may have a shape in which the sixth clearance surface becomes gradually wider toward the upper surface, and the first obtuse angle and the second obtuse angle may be the same as each other and the first acute angle and the second acute angle may be the same as each other.

In another example, the upper surface may include a planar portion; a chip breaker surface protruding above the planar portion while gradually protruding toward outer side, the chip breaker surface being connected to the upper main cutting edge and the upper sub cutting edge and guiding chips cut by the upper main cutting edge and the upper sub cutting edge; and a dimple formed concavely in the chip breaker surface.

The upper surface and the lower surface may be rotationally symmetrical with respect to each other by 180 degrees with respect to the reference axis connecting from a center point of one of the three corners, past a center line of an insert body, to a center point of a boundary portion between the first side surface and the second side surface on the opposite side.

A lower sub cutting edge may be formed at an edge between the lower surface and the first side surface, a lower main cutting edge may be formed at an edge between the lower surface and the second side surface, and the lower sub cutting edge and the lower main cutting edge may be continuously disposed between the respective corners.

Meanwhile, a cutting tool according to an embodiment of the present disclosure is a cutting tool equipped with the cutting insert according to embodiments described above, in which the first and second side surfaces may be placed on both sides with respect to the respective corners, and the cutting tool may include a first seat surface that is in surface contact with the second clearance surface of the first side surface, and a second seat surface that is in surface contact with the fifth clearance surface of the second side surface, and a second angle defined between the first seat surface and the second seat surface may be set equally as the first angle defined between the upper main cutting edge and the upper sub cutting edge.

Advantageous Effects

The present disclosure gives the following effects. As described above, a cutting insert and a cutting tool equipped with the cutting insert according to the embodiment of the present invention may have the following effects.

According to the embodiment of the present invention, by the technical configuration in which the angle defined between the upper main cutting edge and upper sub cutting edge placed on both sides with respect to the corner is larger than or equal to 85 degrees and smaller than 90 degrees, as compared with the conventional art, the first side surface on which the upper main cutting edge is formed and the second side surface on which the upper sub cutting edge is formed may have a wedge shape centered on the corner, and accordingly, the first and second side surfaces can be mounted in a wedge shape on the first and second seat surfaces of the cutting tool and accordingly, the fastening property with the cutting tool can be increased. Specifically, because the fastening property with the cutting tool is increased, it is possible to effectively control the centrifugal force exerted on the cutting insert during rotation of the cutting tool, to thus minimize breakage or abrasion due to shaking of the cutting insert or the cutting tool, thereby preventing a reduction in the service life of the cutting insert or the cutting tool. As revealed by a result of the experiment, below 85 degrees, the workpiece is not machined at a right angle, and at 90 degrees or above, the centrifugal force exerted on the cutting insert during the rotation of the cutting tool can be effectively controlled as described above with reference to the problem of the conventional art.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present disclosure will be described in detail with reference to the accompanying drawings. However, the description proposed herein is just a preferable example for the purpose of illustrations only, not intended to limit the scope of the disclosure, so it should be understood that other equivalents and modifications could be made thereto without departing from the scope of the disclosure.

Figure 1:
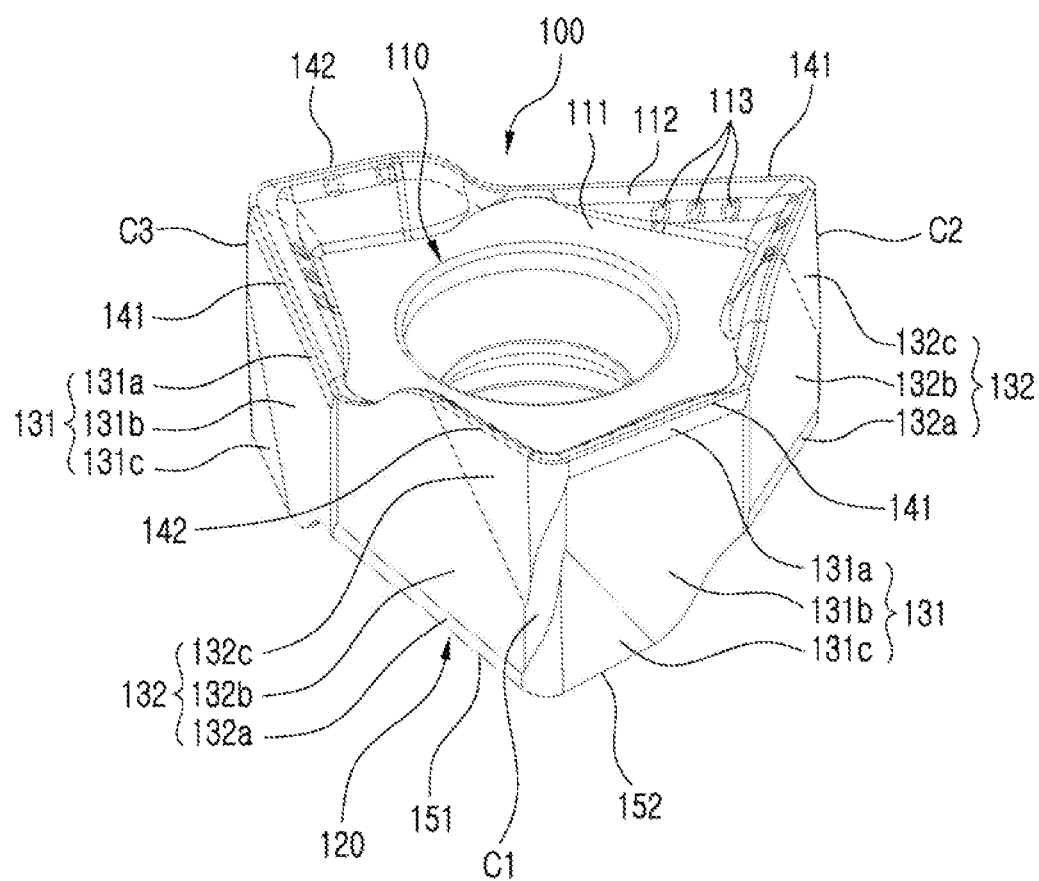
FIG. 1 is a perspective view schematically illustrating a cutting insert according to an embodiment of the present invention.
Figure 2:
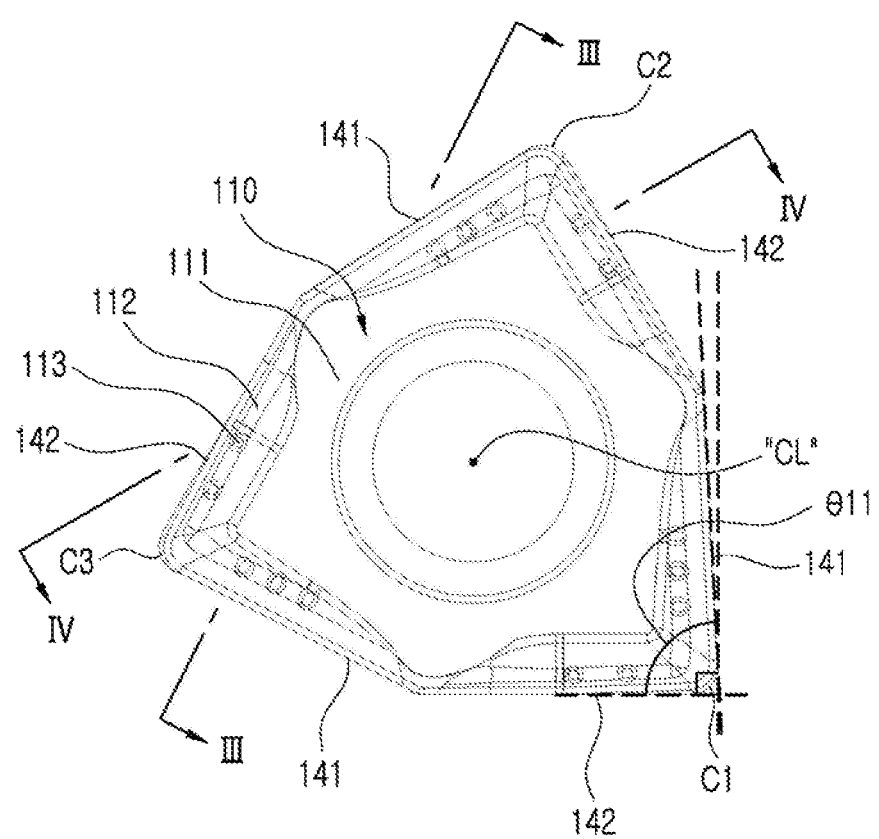
FIG. 2 is a plan view illustrating an upper surface of the cutting insert of FIG. 1.
Figure 3:
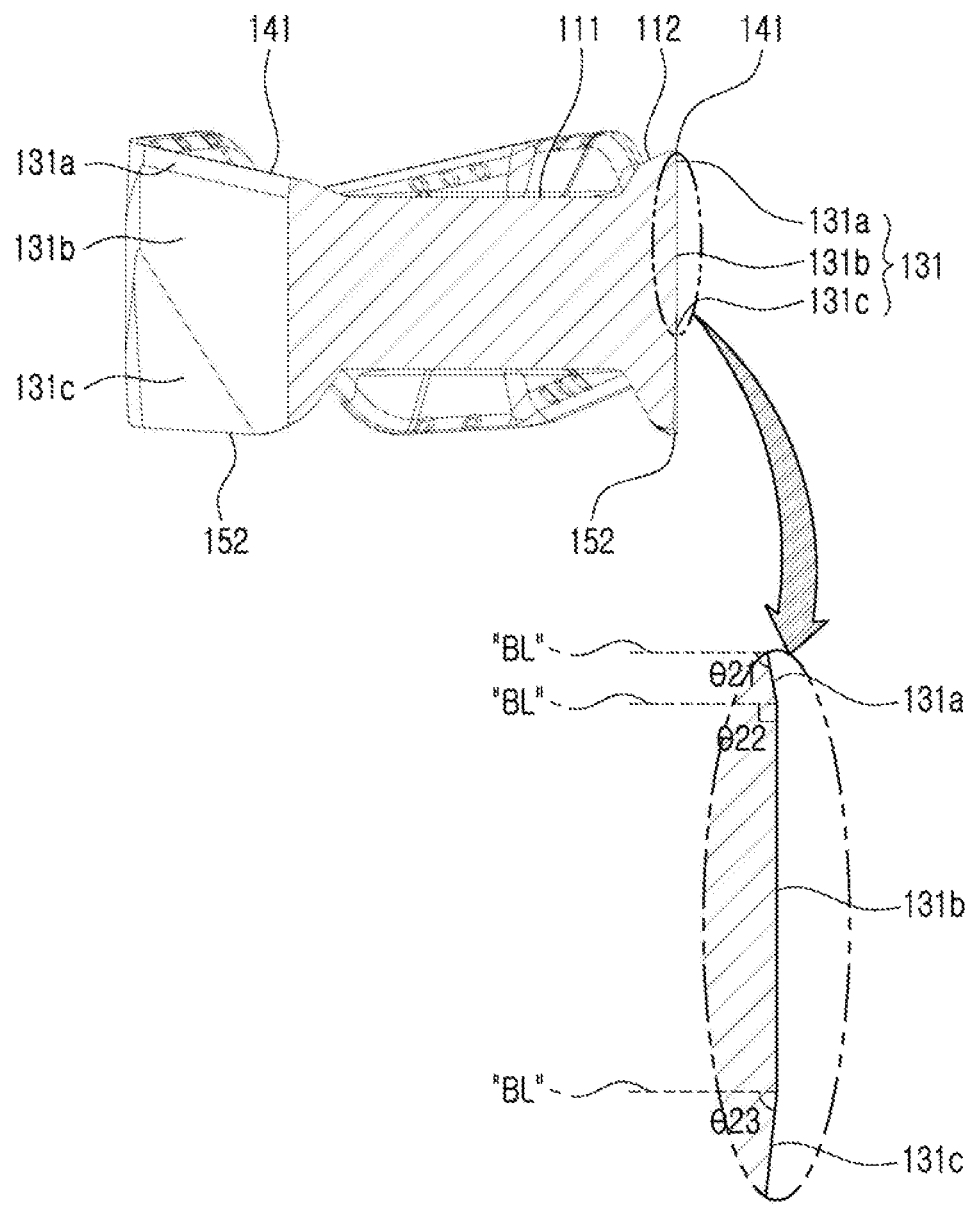
FIG. 3 is a cross-sectional view of the cutting insert of FIG. 2 taken along line
Figure 4:
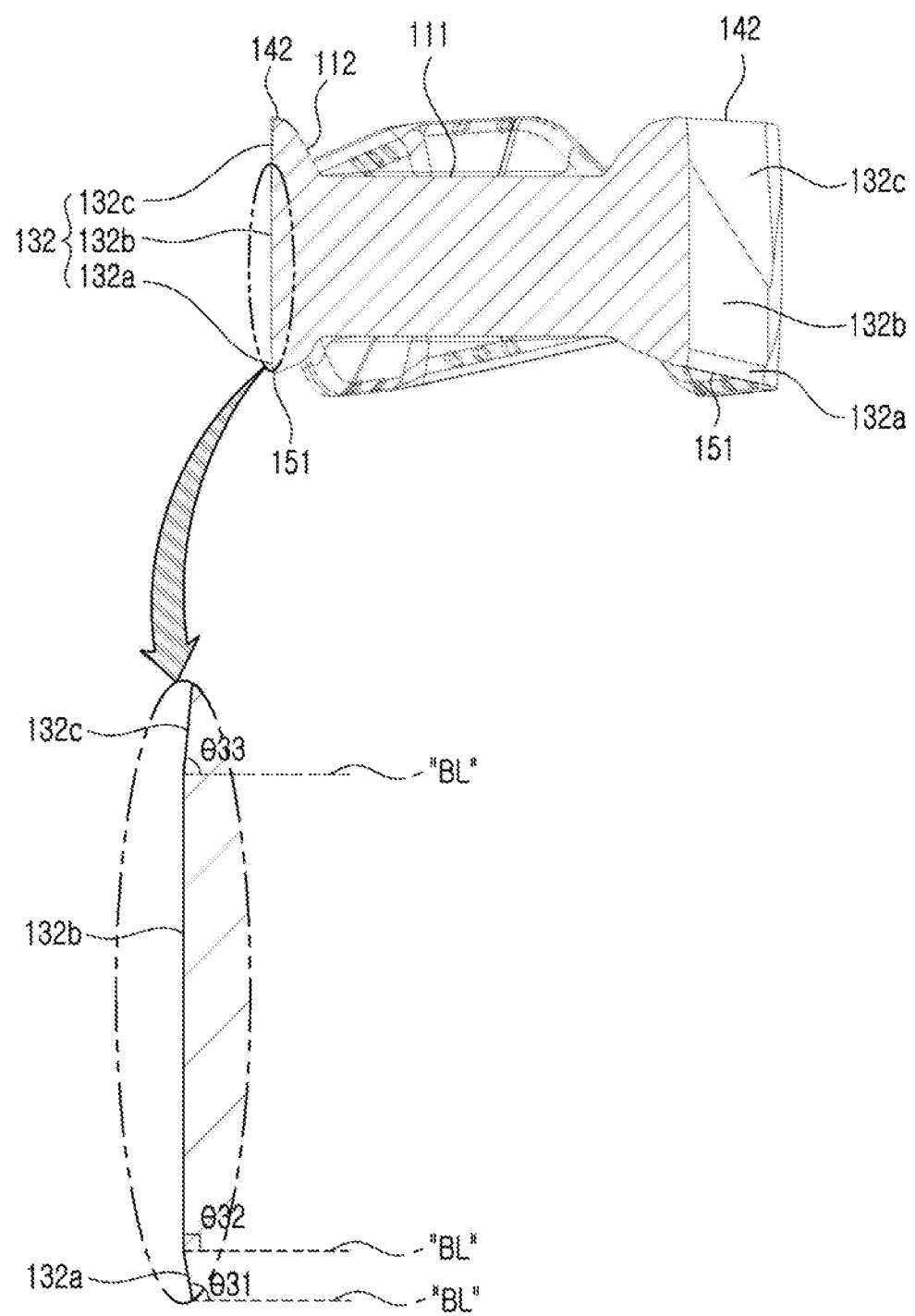
FIG. 4 is a cross-sectional view of the cutting insert of FIG. 2 taken along line IV-IV.

FIG. 1 is a perspective view schematically illustrating a cutting insert according to an embodiment of the present invention, FIG. 2 is a plan view illustrating an upper surface of the cutting insert of FIG. 1, FIG. 3 is a cross-sectional view of the cutting insert of FIG. 2 taken along line and FIG. 4 is a cross-sectional view of the cutting insert of FIG. 2 taken along line IV-IV.

Figure 5:
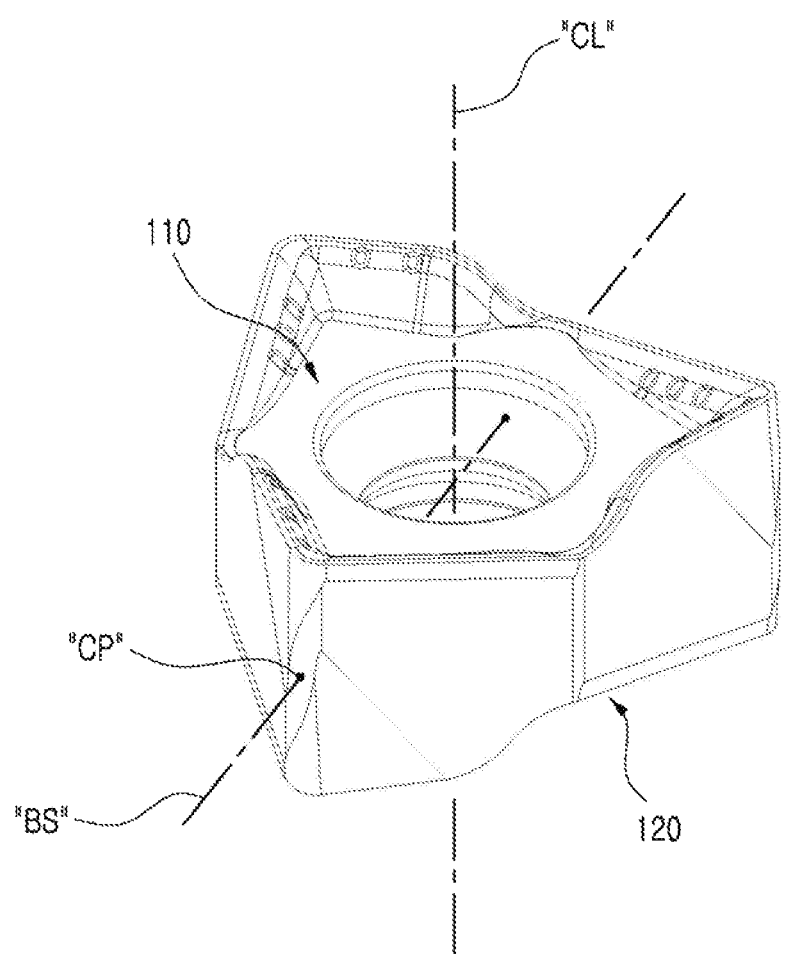
FIG. 5 is a view provided to show a state in which the upper and lower surfaces of the cutting insert of FIG. 1 are rotationally symmetrical by 180 degrees with respect to the reference axis.

FIG. 5 is a view provided to show a state in which the upper and lower surfaces of the cutting insert of FIG. 1 are rotationally symmetrical by 180 degrees with respect to the reference axis.

As shown in FIGS. 1 to 5, the cutting insert 100 according to an embodiment of the present invention includes three corners C1, C2, and C3 along the circumference, in which an upper main cutting edge 141 formed at an edge between the upper surface 110 and the first side surface 131 and an upper sub cutting edge 141 formed at an edge between the upper surface 110 and the second side surface 132 are continuously disposed between respective corners C1 C2, and C3, and a lower surface 120 has the same shape as an upper surface 110. Particularly, as shown in FIG. 2, the first angle θ11 defined between the upper main cutting edge 141 and the upper sub cutting edge 142 placed on both sides with respect to the respective corners C1, C2 and C3 is smaller than 90 degrees, or preferably, larger than or equal to 85 degrees and smaller than 90 degrees. Accordingly, the present disclosure provides a technical configuration in which the first angle θ11, which is defined between the upper main cutting edge 141 and the upper sub cutting edge 142 that are placed on both sides with respect to the respective corners C1, C2 and C3, is smaller than 90 degrees, or preferably, larger than or equal to 85 degrees and smaller than 90 degrees. Accordingly, the first side surface 131 on which the upper main cutting edge 141 is formed and the second side surface 132 on which the upper sub cutting edge 142 have a wedge shape centered on the corners C1, C2 and C3 such that the first and second side surfaces 131 and 132 are mounted in a wedge shape to the first and second seat surfaces 201 and 202 of the cutting tool 200 (see FIG. 6), and it is possible to provide improved fastening property with the cutting tool 200. as compared with the conventional art. Specifically, because the fastening property with the cutting tool is increased, it is possible to effectively control the centrifugal force exerted on the cutting insert during rotation of the cutting tool 200, to thus minimize breakage or abrasion due to shaking of the cutting insert or the cutting tool, thereby preventing a reduction in the service life of the cutting insert 100 or the cutting tool 200. As revealed by a result of the experiment, if the first angle (θ11) is smaller than 85 degrees, the workpiece (see 10 in FIG. 7) is not machined at a right angle, and if the first angle θ11 is larger than or equal to 90 degrees, the centrifugal force exerted on the cutting insert 100 during the rotation of the cutting tool 200 cannot be effectively controlled as described above with reference to the problem of the conventional art.

In addition, as shown in FIGS. 1 and 3, the upper surface 110 may include a planar portion 111 and the first side surface 131 may include first, second and third clearance surfaces 131*a*, 131*b* and 131*c* in a first direction from the upper surface 110 to the lower surface 120.

Specifically, as shown in FIG. 3, the first clearance surface 131*a* may form a first obtuse angle (θ21) in the first direction with respect to the reference surface BL parallel to the planar portion 111 and reach the second clearance surface 131*b*, the second clearance surface 131*b* may form a right angle (θ22) with respect to the reference surface BL and reach the third clearance surface 131*c* and a portion of the lower surface 120, and the third clearance surface 131*c* may form a first acute angle (θ23) in the first direction with respect to the reference surface BL and reach the other portion of the lower surface 120.

In addition, as shown in FIGS. 1 and 4, the second side surface 132 may include fourth, fifth, and sixth clearance surfaces 132*a*, 132*b*, 132*c* in a second direction from the lower surface 120 toward the upper surface 110.

Specifically, as shown in FIG. 4, the fourth clearance surface 132*a* may form a second obtuse angle (θ31) in the second direction with respect to the reference surface BL and reach the fifth clearance surface 132*b*, the fifth clearance surface 132*b* may form a right angle (θ32) with respect to the reference surface BL and reach the sixth clearance surface 132*c* and a portion of the lower surface 110, and the sixth clearance surface 132*c* may form a second acute angle (θ33) in the second direction with respect to the reference surface BL and reach the other portion of the lower surface 110.

Accordingly, by the technical configuration in which the first clearance surface 131*a* of the first side surface 131 forms the first obtuse angle (θ21) in the first direction (from the upper surface 110 to the lower surface 120) with respect to the reference surface BL and reaches the second clearance surface 131*b*, the contact force with the workpiece (see 10 in FIG. 7) exerted on the upper main cutting edge 141 is dispersed to the first clearance surface 131*a* formed at the first obtuse angle (θ21), and accordingly, the edge strength of the upper main cutting edge 141 can be increased. In addition, by the technical configuration in which the sixth clearance surface 132*c* of the second side surface 132 forms the second acute angle (θ33) (that is, the obtuse angle with respect to the direction from the lower surface 120 toward the upper surface 110) in the second direction (from the lower surface 120 toward the upper surface 110) with respect to the reference surface BL and reaches the other portion of the upper surface 110, the contact force with the workpiece on the upper sub cutting edge 142 is dispersed to the sixth clearance surface 132*c* forming the obtuse angle (θ21) with respect to the reference surface BL in the direction from the upper surface 110 to the lower surface 120, and accordingly, the edge strength of the upper sub cutting edge 142 can be increased.

In addition, by the technical configuration in which the second clearance surface 131*b* of the first side surface 131 forms a right angle (θ22) with respect to the reference surface BL and reaches the third clearance surface 131*c* and a portion of the lower surface 120, controlling the angle is relatively easier as compared with the obtuse angle or acute angle, and accordingly, it is easier to machine the first seat surface 201 of the cutting tool 200 in surface contact, and also tight surface contact can be achieved, thus leading into increased fastening force. In addition, by the technical configuration in which the fifth clearance surface 132*b* of the second side surface 132 forms a right angle (θ22) with respect to the reference surface BL and reaches the sixth clearance surface 132*c* and a portion of the upper surface 110, controlling the angle can be as easy as the second clearance surface 131*b*, while it is easier to machine the second seat surface 202 of the cutting tool 200 in surface contact, and also the tight surface contact can be achieved, thus leading into increased fastening force.

In addition, by the technical configuration in which the third clearance surface 131*c* of the first side surface 131 forms the first acute angle (θ23) in the first direction (from the upper surface 110 toward the lower surface 120) with respect to the reference surface BL and reaches another portion of the lower surface, the third clearance surface 131*c* placed on the rear side with respect to the rotation direction of the cutting tool 200 can prevent a contact with the workpiece (see 10 in FIG. 7) through the first acute angle (θ23), thereby protecting the lower sub cutting edge 152 not in use. In addition, by the technical configuration in which the fourth clearance surface 132*a* of the second side surface 132 forms the second obtuse angle (θ31) in the second direction (that is, the direction from the lower surface 120 toward the upper surface 110) with respect to the reference surface BL and reaches fifth clearance surface 132*b*, the fourth clearance surface 132*a* placed on the rear side with respect to the rotation direction of the cutting tool 200 forms an acute angle with respect to the reference surface in the first direction from the upper surface 110 to the lower surface 120 can prevent a contact with the workpiece, thereby protecting the lower main cutting edge 151 not in use.

Further, the third clearance surface 131*c* may have a shape in which it 131*c* may become gradually wider toward the lower surface 120, and the sixth clearance surface 132*c* may have a shape in which it 132*c* may become gradually wider toward the upper surface 110 in order to prevent a back touch during processing, and the first obtuse angle (θ21) and the second obtuse angle (θ31) may be equal to each other and the first acute angle (θ23) and the second acute angle (θ33) may be equal to each other.

In addition, the upper surface 110 may further include a chip breaker surface 112 and a dimple 113, as shown in FIGS. 1 and 2. The chip breaker surface 112 is formed to protrude above the planar portion 111, while gradually protruding toward the outer edge (that is, the main cutting edge 141 and sub cutting edge 142), and is connected to the upper main cutting edge 141 and the upper sub cutting edge 142, and guides the chips cut by the upper main cutting edge 141 and the upper sub cutting edge 142. The dimples 113 are recessed in the chip breaker surface 112.

Accordingly, by the technical configuration in which the dimple 113 is recessed on the chip breaker surface 112, the contact area of the chips cut by the upper main cutting edge 141 and the upper sub cutting edge 142 is reduced, and therefore, it is possible to reduce frictional heat of the chip breaker surface 112 as well as abrasion, thereby maximizing the service life of the cutting insert 100.

Further, as shown in FIG. 5, the upper surface 110 and the lower surface 120 may be rotationally symmetrical by 180 degrees with respect to each other with respect to the reference axis BS connecting from a center point CP of one (e.g., C1) of the three corners C1, C2, and C3, past a center line CL of the insert body, to the center point (not illustrated) of the boundary portion between the first side surface 131 and the second side surface 132 on the opposite side.

Accordingly, the lower sub cutting edge 152 is formed at the edge between the lower surface 120 and the first side surface 131, the lower main cutting edge 151 is formed at the edge between the lower surface 120 and the second side surface 132, and the lower sub cutting edge 152 and the lower main cutting edge 151 may be continuously disposed between the respective corners C1, C2, and C3. For reference, the upper and lower main cutting edges and sub cutting edges are placed opposite to each other because they are rotationally symmetrical by 180 degrees as described above. That is, as shown in FIG. 1, when the upper main cutting edge 141 is formed between the first side surface 131 and the upper surface 110, the lower sub cutting edge 152 is formed between the first side surface 131 and the lower surface 120, and when the upper sub cutting edge 142 is formed between the second side surface 132 and the upper surface 110, the lower main cutting edge 151 is formed between the second side surface 132 and the lower surface 120.

Hereinafter, a cutting tool 200 according to an embodiment of the present invention will be described with reference to FIGS. 6 and 7.

Figure 6:
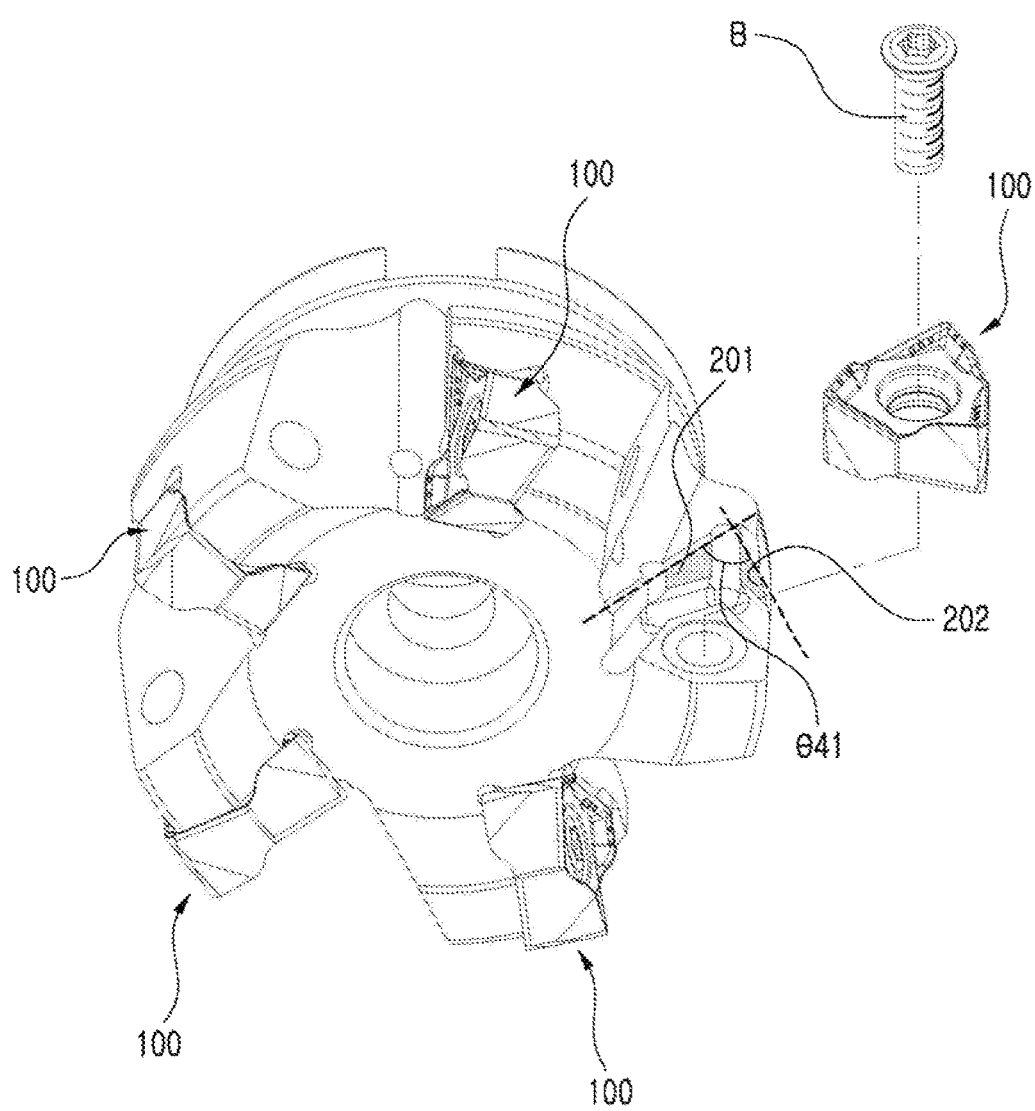
FIG. 6 is an exploded perspective view provided to show a state in which the cutting insert of FIG. 1 is mounted on a cutting tool.
Figure 7:
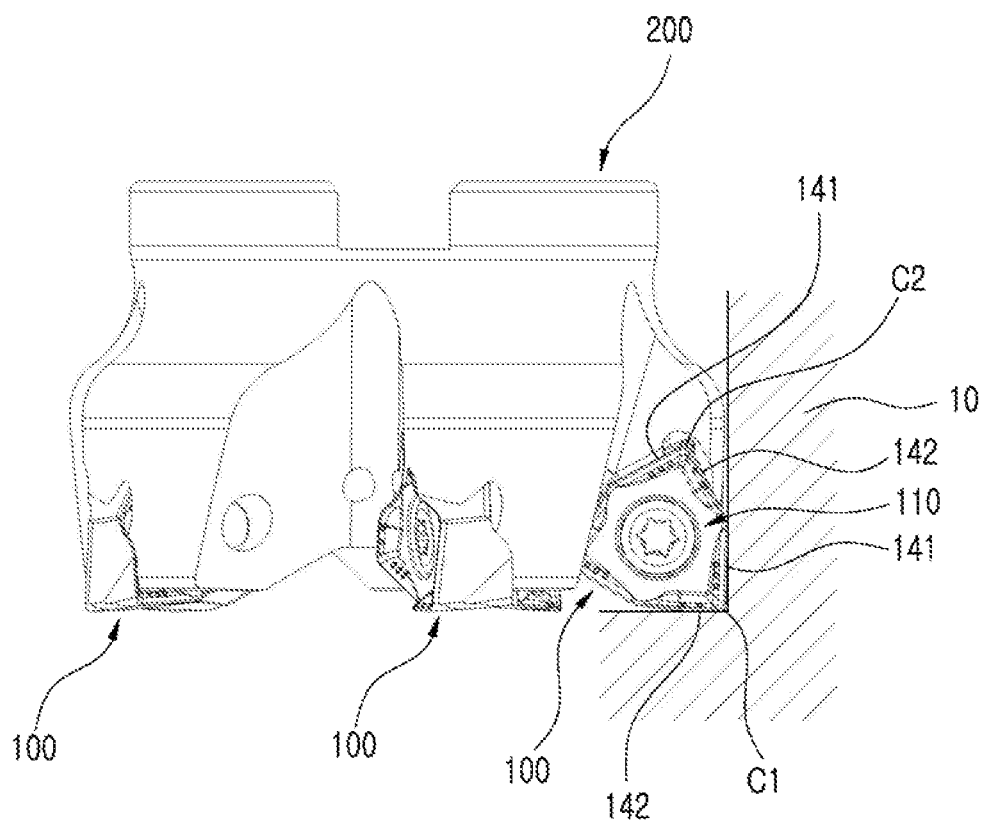
FIG. 7 is a view provided to show a state in which the cutting insert of FIG. 1 is mounted on a cutting tool to cut the workpiece.
Figure 8:
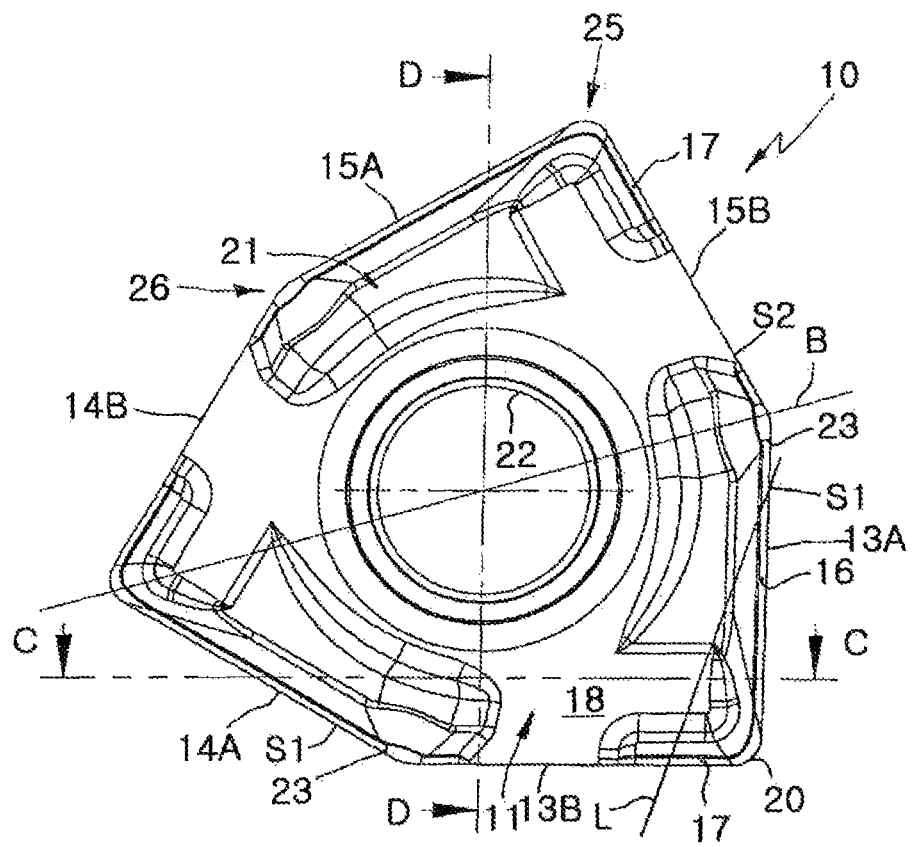
FIG. 8 is a plan view of a conventional milling insert.
Figure 9:
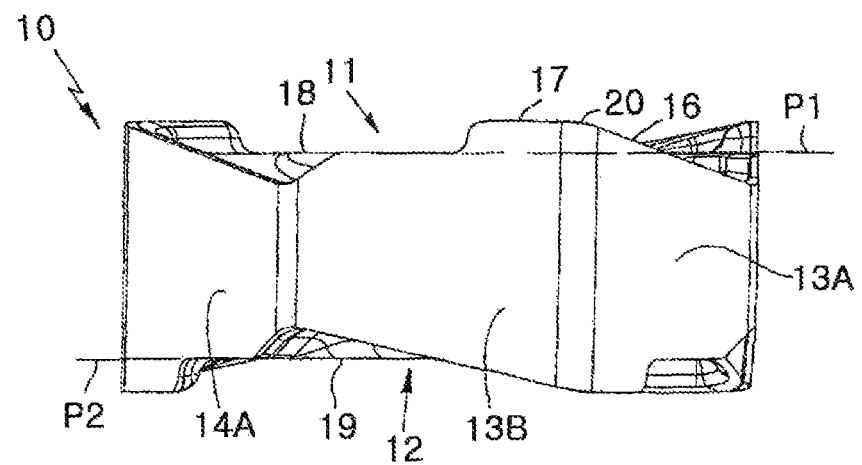
FIG. 9 is a side view of the milling insert of FIG. 8.
Figure 10:
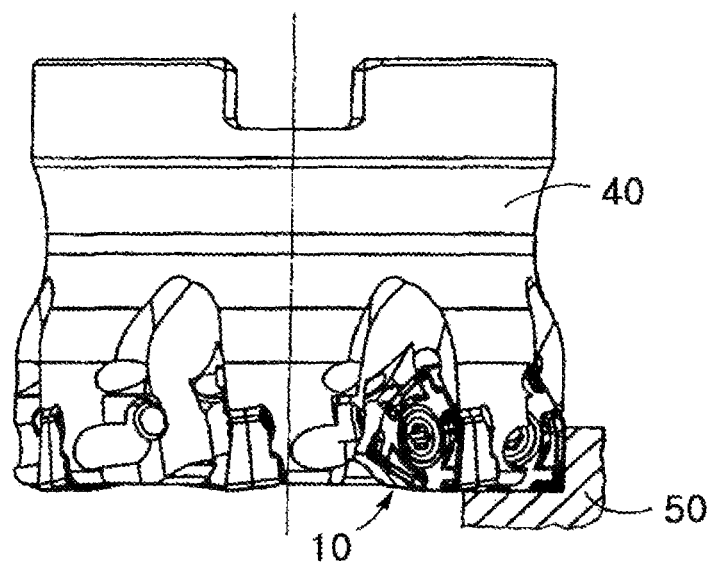
FIG. 10 is a view of the milling tool equipped with the milling insert of FIG. 8.

FIG. 6 is an exploded perspective view provided to show a state in which the cutting insert of FIG. 1 is mounted on a cutting tool, and FIG. 7 is a view provided to show a state in which the cutting insert of FIG. 1 is mounted on a cutting tool to cut the workpiece.

The cutting tool 200 according to one embodiment of the present disclosure includes a first seat surface 201 and a second seat surface 202, as shown in FIGS. 6 and 7.

When the first and second side surfaces 131 and 132 are placed on both sides with respect to the corners C1, C2 and C3, respectively, the first seat surface 201 is in surface contact with the second clearance surface 131b of the first side surface 131 and the second seat surface 202 is in surface contact with the fifth clearance surface 132b of the second side surface 132. Specifically, the second angle θ41 defined between the first seat surface 201 and the second seat surface 202 is set equally as the first angle θ11 defined between the upper main cutting edge 141 and the upper sub cutting edge 142.

The first and second side surfaces 131 and 132 may be mounted in a wedge shape on the first and second seat surfaces 201 and 202 of the cutting tool 200, thereby improving the fastening property with the cutting tool 200. Specifically, because the fastening property with the cutting tool is increased, it is possible to effectively control the centrifugal force exerted on the cutting insert during rotation of the cutting tool 200, to thus minimize breakage or abrasion due to shaking of the cutting insert or the cutting tool, thereby preventing a reduction in the service life of the cutting insert 100 or the cutting tool 200.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present invention relates to a cutting insert and a cutting tool equipped with the cutting insert, and thus can be applied to cutting a workpiece and industrially applicable.

What is claimed is:

1. A cutting insert, comprising:
three corners along a circumference thereof, wherein an upper main cutting edge, which is formed on an edge between an upper surface and a first side surface, and an upper sub cutting edge, which is formed on an edge between the upper surface and a second side surface, are continuously disposed between the respective corners, and a lower surface has the same shape as that of the upper surface, and
wherein a first angle, which is defined between the upper main cutting edge and the upper sub cutting edge that are placed on both sides with reference to the respective corners, is smaller than 90°, and
wherein:
the upper surface comprises a planar portion,
the first side surface comprises first, second, and third clearance surfaces in a first direction from the upper surface toward the lower surface,
the first clearance surface forms a first obtuse angle in the first direction with respect to a reference surface parallel to the planar portion and reaches the second clearance surface,
the second clearance surface forms a right angle with the reference surface and reaches the third clearance surface and a portion of the lower surface, and
the third clearance surface forms a first acute angle with respect to the reference surface in the first direction and reaches another portion of the lower surface.

2. The cutting insert of claim 1, wherein
the second side surface comprises fourth, fifth and sixth clearance surfaces in a second direction from the lower surface toward the upper surface,
the fourth clearance surface forms a second obtuse angle with respect to the reference surface in the second direction and reaches the fifth clearance surface,
the fifth clearance surface forms a right angle with respect to the reference surface and reaches the sixth clearance surface and a portion of the upper surface, and
the sixth clearance surface forms a second acute angle with respect to the reference surface in the second direction and reaches another portion of the upper surface.

3. The cutting insert of claim 2, wherein
the third clearance surface has a shape in which the third clearance surface becomes gradually wider toward the lower surface,
the sixth clearance surface has a shape in which the sixth clearance surface becomes gradually wider toward the upper surface,
the first obtuse angle and the second obtuse angle are the same as each other, and
the first acute angle and the second acute angle are the same as each other.

4. The cutting insert of claim 1, wherein the upper surface comprises:

a chip breaker surface protruding above the planar portion while gradually protruding toward outer side, the chip breaker surface being connected to the upper main cutting edge and the upper sub cutting edge and guiding chips cut by the upper main cutting edge and the upper sub cutting edge; and a dimple formed concavely in the chip breaker surface.

5. The cutting insert of claim 1, wherein the upper surface and the lower surface are rotationally symmetrical with respect to each other by 180 degrees with respect to a reference axis connecting from a center point of one of the three corners, past a center line of the cutting insert, to a center point of a boundary portion between the first side surface and the second side surface which are disposed between remaining two of the three corners.

6. The cutting insert of claim 5, wherein a lower sub cutting edge is formed at an edge between the lower surface and the first side surface, a lower main cutting edge is formed at an edge between the lower surface and the second side surface, and the lower sub cutting edge and the lower main cutting edge are continuously disposed between the respective corners.

7. The cutting insert of claim 1, wherein the first angle is larger than or equal to 85° and smaller than 90°.

8. A cutting tool equipped with the cutting insert of claim 3, wherein the cutting tool comprises a first seat surface that is in surface contact with the second clearance surface of the first side surface that is disposed at one side of one of the three corners of the cutting insert, and a second seat surface that is in surface contact with the fifth clearance surface of the second side surface that is disposed at another side of said one of the three corners of the cutting insert, wherein a second angle defined between the first seat surface and the second seat surface is set equally as the first angle defined between the upper main cutting edge and the upper sub cutting edge.

9. The cutting insert of claim 2, wherein the upper surface and the lower surface are rotationally symmetrical with respect to each other by 180 degrees with respect to a reference axis connecting from a center point of one of the three corners, past a center line of the cutting insert, to a center point of a boundary portion between the first side surface and the second side surface which are disposed between remaining two of the three corners.

10. The cutting insert of claim 3, wherein the upper surface and the lower surface are rotationally symmetrical with respect to each other by 180 degrees with respect to a reference axis connecting from a center point of one of the three corners, past a center line of the cutting insert, to a center point of a boundary portion between the first side surface and the second side surface which are disposed between remaining two of the three corners.

11. The cutting insert of claim 4, wherein the upper surface and the lower surface are rotationally symmetrical with respect to each other by 180 degrees with respect to a reference axis connecting from a center point of one of the three corners, past a center line of the cutting insert, to a center point of a boundary portion between the first side surface and the second side surface which are disposed between remaining two of the three corners.

12. The cutting insert of claim 9, wherein a lower sub cutting edge is formed at an edge between the lower surface and the first side surface, a lower main cutting edge is formed at an edge between the lower surface and the second side surface, and the lower sub cutting edge and the lower main cutting edge are continuously disposed between the respective corners.

13. The cutting insert of claim 10, wherein a lower sub cutting edge is formed at an edge between the lower surface and the first side surface, a lower main cutting edge is formed at an edge between the lower surface and the second side surface, and the lower sub cutting edge and the lower main cutting edge are continuously disposed between the respective corners.

14. The cutting insert of claim 11, wherein a lower sub cutting edge is formed at an edge between the lower surface and the first side surface, a lower main cutting edge is formed at an edge between the lower surface and the second side surface, and the lower sub cutting edge and the lower main cutting edge are continuously disposed between the respective corners.

* * * * *